| United States Patent [19] | [11] Patent Number: 5,011,883 |
|---|---|
| Aksman | [45] Date of Patent: Apr. 30, 1991 |

[54] STABILIZED POLYMER LATEX COMPOSITION

[75] Inventor: Igor Aksman, Dover, Del.

[73] Assignee: ICI Americas Inc., Wilmington, Del.

[21] Appl. No.: 476,192

[22] Filed: Feb. 7, 1990

[51] Int. Cl.$^5$ .............. C08L 67/00; C08L 33/06; C08G 63/49; C08G 63/52

[52] U.S. Cl. .................. 524/513; 525/7; 525/32.2; 528/303; 524/560

[58] Field of Search .............. 525/7; 524/513

[56] References Cited

U.S. PATENT DOCUMENTS

| 4,010,126 | 3/1977 | Kuzma | 525/7 |
| 4,299,742 | 11/1981 | Belder et al. | 106/253 |

FOREIGN PATENT DOCUMENTS 0325054 7/1989 European Pat. Off.

Primary Examiner—Joseph L. Schofer
Assistant Examiner—Wu C. Cheng
Attorney, Agent, or Firm—William E. Dickheiser

[57] ABSTRACT

Stabilized aqueous polymer latex compositions comprising: (A) a polymeric latex particle; (B) a protective colloid; and (C) a polyoxyalkylene-containing alkyd resin which is the reaction product of (i) at least one polyoxyalkylene, (ii) at least one polyol; (iii) at least one polycarboxylic acid anhydride; and (iv) at least one monocarboxylic acid are disclosed. Also detailed is a method of producing such a stabilized polymer latex composition.

23 Claims, No Drawings

STABILIZED POLYMER LATEX COMPOSITION

FIELD OF THE INVENTION

This invention is directed to a stabilized aqueous polymer latex composition comprising: (A) polymeric latex particles; (B) a protective colloid; and (C) a poly(oxyalkylene)-containing alkyd resin which is the reaction product of at least one (i) poly(oxyalkylene) compound; (ii) polyol; (iii) polycarboxylic acid, chloride or anhydride: and (iv) monocarboxylic acid. In another aspect, this invention is directed to a method of producing such a stabilized polymer latex composition.

BACKGROUND OF THE INVENTION

The employment of emulsion polymers for a wide variety of uses, including as coatings, adhesives, binders for fabrics, fibers and the like, is widespread in industry. In the past, polymers such as acrylates, methacrylates, vinyls and the like were typically employed in the form of solutions in various organic solvents. However, because of both cost and environmental considerations, there has been a continuing trend to replace such organic solvents with water with the resultant formation of aqueous dispersions.

This conversion from the use of organic solutions to aqueous emulsions, while beneficial from many standpoints, has nevertheless resulted in the creation of formulation problems. Specifically, unlike organic-based compositions which are, in general, true solutions, such aqueous-based compositions are dispersions which, without the presence of an effective stabilization agent, will settle out or coagulate upon storage, or under the high shear conditions associated with many application methods. Accordingly, there have been several attempts to provide compounds which will provide desirable storage stability to such aqueous polymer emulsions.

One class of compounds which has been used to afford stability to such emulsion polymer latices are high molecular weight water soluble compounds which are classified as protective colloids. Specific examples of such water soluble protective colloids include polyvinyl alcohols of various molecular weights and degree of hydrolysis, and cellulose derivatives such as hydroxyethylcellulose. These protective colloids are further described in publications, such as, for example, Hercules, Inc. bulletin YC-4506 and in "Water Soluble Polymers: Beauty With Performance," J. E. Glass, Ed., Advances in Chemistry Series 213, ACS (1986).

European Patent Publication 325,054 dated July 26, 1989 discloses a class of dispersion-stabilizing compositions which are the reaction products of (1) a compound containing a poly(oxyalkylene) group and having at least two -OH groups; (2) a compound other than as defined in (1) which contains at least two reactive hydrogen atoms present as -OH, -NH$_2$ or -NHR; (3) a carboxylic acid containing at least two carboxylic acid groups or an anhydride or chloride thereof; and (4) a mono-carboxylic acid, a mono-hydroxycompound, a secondary mono-amine or a hindered primary mono-amine. These non-ionic compositions are described as being useful in the preparation of a wide range of emulsions or dispersions of solids and liquids.

Although both these classes of compounds have been individually found to greatly enhance the stability of emulsion polymer latices, it would nevertheless be desirable to possess dispersant compositions which yield additionally enhanced stability to such latex formulations as well as which provide improvement in polymerization parameters.

Accordingly, it is an object of this invention to provide a polymer latex composition exhibiting enhanced stability.

It is a further object of this invention to provide a polymer latex composition exhibiting reduced coagulation formation during the polymerization process.

It is yet a further object of this invention to provide a method for the production of a stable emulsion polymer latex with reduced coagulation formation.

These objects and other additional objects will become more fully apparent from the following description and accompanying Examples.

SUMMARY OF THE INVENTION

In one aspect, this invention is directed to a stabilized aqueous polymer latex composition comprising:
(A) polymeric latex particles:
(B) a protective colloid: and
(C) a poly(oxyalkylene)-containing alkyd resin which is the reaction product of:
  (i) at least one polyoxyalkylene compound;
  (ii) at least one polyol;
  (iii) at least one polycarboxylic acid chloride or anhydride: and
  (iv) at least one monocarboxylic acid.

In another aspect, this invention is directed to a process for producing a stabilized aqueous polymer latex composition, which process comprises the steps:
(A) blending together a mixture comprising:
  (i) water;
  (ii) monomer;
  (iii) a protective colloid; and
  (iv) a poly(oxyalkylene)-containing alkyd resin; and
(B) subjecting such blend to polymerization conditions.

DETAIL DESCRIPTION OF THE PREFERRED EMBODIMENTS

The stabilized aqueous polymer latex composition of the invention is comprised of polymeric particles, a protective colloid and a polyoxyalkylene-containing alkyd resin.

The polymeric latex particles, the dispersion of which is stabilized in the composition of this invention, may be prepared from one or more suitable monomeric materials containing one or more ethylenically unsaturated bond. Illustrative of such monomers are alkyl acrylates, such as methyl acrylate, ethyl acrylate, butyl acrylate and the like: alkyl methacrylates, such as methyl methacrylate, ethyl methacrylate, butyl methacrylate and the like: vinyl monomers such as vinyl acetate, vinyl chloride, vinylidene chloride, acrylonitrile, methacrylonitrile, styrene, alpha-alkyl styrenes, divinyl benzene and the like; polycarboxy-based monomers such as dimethyl fumarate, diethyl fumarate, dimethyl maleate, diethyl maleate, dimethyl itaconate, di(ethylene glycol) maleate, di(ethylene glycol)itaconate, bis(2-hydroxyethyl)malonate, and the like; hydroxyl-containing unsaturated compounds such as beta-hydroxyethyl acrylate, beta-hydroxyethyl methacrylate, hydroxypropyl acrylate, hydroxypropyl methacrylate, hydroxybutyl acrylate, hydroxybutyl methacrylate, 3-chloro-2-hydroxypropyl methacrylate, and the like. Polymeric materials which may be preferably noted include poly(vinyl acetate), poly(styrene), poly(vinyl chloride) and poly(methyl methacrylate).

The polymeric materials described above are suspended in the form of particles. Generally, such particles will possess a diameter of between about 0.01 and about 10 microns. Preferably, such diameter will range between about 0.05 and about 7, more preferably between about 0.1 and about 5 microns. However, it will be understood that the optimum particle size will vary in accordance with factors such as the particular polymer employed, the specific end use contemplated, and the like. However, one of ordinary skill in the art could readily determine the optimum particle size for a given polymer and end use.

The protective colloids which may be employed are high molecular weight polymeric molecules containing sufficient hydrophilic groups as part of their backbone or as pendent groups such that they are water soluble. Such molecules are familiar to those of ordinary skill in the latex art and typically possess molecular weights ranging from one hundred thousand or less to several million or more. Illustrative of such protective colloids are polyvinyl alcohols, cellulosics, such as hydroxyethylcellulose, hydroxypropylcellulose, carboxymethylcellulose, carboxyethylcellulose and the like: polyacrylamides, guar gum and xantham gum. These materials are described in publications such as Hercules, Inc. bulletin VC-450C, and in "Water Soluble Polymers: Beauty With Performance," by J. E. Glass, Ed. Advances in Chemistry Series, 213, ACS (1986).

The polyoxyalkylene-containing alkyd resins employed in the practice of this invention are the reaction products of (i) at least one polyoxyalkylene compound; (ii) at least one polyol: (iii) at least one polycarboxylic acid, chloride or anhydride; and (iv) at least one monocarboxylic acid. Representative of such polyoxyalkylene-substituted alkyd resins are the compounds described in European Patent Publication 325,054.

The poly(oxalkylene) compounds which can be used as component (i) contain at least one poly(oxyalkylene) group which is typically of the type $(AO)_n$ where A is an alkylene group containing at least two carbon atoms and not more than six carbon atoms and n is an integer with a value of at least two and typically is at least ten. The group A is preferably an ethylene, propylene or butylene group, most preferably, an ethylene group.

The poly(oxyalkylene) compounds may be condensates of a poly(oxyalkylene) group with a polyol, an example of such a compound being polyoxyethylene sorbitol containing one polyoxyethylene group in which the value of n is typically from 20 to 50.

Alternatively the poly(oxyalkylene) compound may be a block copolymer of two different poly(oxyalkylene) groups, for example a poly(oxyethylene)-poly-(oxypropylene)-poly(oxyethylene) polymer, typically one in which at least 50% of the oxyalkylene units are oxyethylene units.

A further alternative poly(oxalkylene) compound is a condensate with a diamine such as ethylenediamine or hexamethylene diamine. Typically in such a compound two poly(oxyalkylene) chains are attached to each nitrogen atom and the compound contains a total of four poly(oxyalkylene) chains, which may be the same as, or different from each other, and may be a block copolymer chain, for example a poly(oxypropylene)-poly(oxyethylene) sequence in which the poly(oxypropylene) is attached to the nitrogen atom of the diamine.

Yet a further type of poly(oxyalkylene) compound is one in which a poly(oxyalkylene) chain is attached as a side chain to a silicone such as a poly(dimethylsiloxane).

The average molecular weight of the poly(oxyalkylene) compound is typically in excess of 1,000 and is preferably in excess of 5,000 or even in excess of 10,000.

More than one poly(oxyalkylene) compounds can be employed in the formation of the poly(oxyalkylene)-containing alkyl resin employed in the composition of the present invention.

The polyol which is employed as component (ii) of the poly(oxyalkylene)-containing alkyd resin contains two or more -OH substituents. Illustrative of such polyols are glycerol, pentaerythritol, sorbitol, pyrogallol or 1,3,5-trihydroxybenzene. Preferred polyols include glycerol, pentaerythritol, sorbitol, and a mixture of pentaerythritol and sorbitol.

The polycarboxylic component (iii) may be any compound containing or derived from a compound containing two or more carboxylic acid groups. Such polyacid may be a saturated or unsaturated aliphatic, cycloaliphatic or aromatic compound. Exempletive of such polyacids or polyacid derivatives are malonic acid, succinic acid, glutaric acid, adipic acid, subaric acid, maleic acid, phthalic acid, terephthalic acid, isophthalic acid, trimellitic acid, pyromellitic acid, succinic anhydride, maleic anhydride, phthalic anhydride, pyromellitic dianhydride, trimellitic anhydride, terephthalic acid dichloride or adipic acid dichloride.

Component (iv) of the reaction mixture used to produce the alkyd resin employed in the present invention is a saturated or unsaturated monocarboxylic acid. Such monocarboxylic acid typically contains at least four, and preferably at least six, carbon atoms. Suitable monocarboxylic acids include hexanoic acid, octanoic acid, decanoic acid, tetradecanoic acid, octadecanoic acid, oleic acid, tall oil fatty acid and linoleic acid.

The materials used to obtain the poly-(oxyalkylene)-containing alkyl resin employed in the composition of the present invention are preferably reacted in amounts to yield a resin essentially free of both reactive hydrogen atoms and carboxylic acid groups. Thus, the materials are preferably employed in amounts such that the hydroxyl groups and the carboxylic acid groups are in essentially equimolar proportions, for example the molar ratio of hydroxyl groups to carboxylic acid groups is generally in the range between about 0.75:1 and about 1.33:1, preferably between about 0.90:1 and about 1.1:1, most preferably between about 0.95:1 and about 1.05:1.

The proportion of each particular component will be dependent on the molecular weight of the component, the number of hydroxyl or carboxylic acid groups it contains and also on the molecular weight of the alkyd resin desired. It will be appreciated that the molecular weight of the product is dependent primarily on the proportion of component (ii) which is used but is also dependent on the molecular weight of component (i).

Typically the proportion of the compound (or compounds) which is component (i) comprises between 10 and about 95% by weight of the total reaction mixture and generally comprises at least about 20% by weight of the total reaction mixture. If component (i) is a compound containing a poly(oxyalkylene) group of the type $(AO)_n$ in which n has a high value, for example at least 20 (hereafter such a material will be referred to as a "high molecular weight compound"), the proportion of component (i) is then typically between about 60 and about 95% by weight, of the total reaction mixture. The polyol compound (or compounds) which is component (ii) typically comprises between about 0.2 and about 40% by weight of the reaction components. If component (i) is a high molecular weight compound (as defined above), then the proportion of component (ii) is typically between about 0.4 and about 5% by weight. The proportion of the polyacid (or polyacids) which is component (iii) is typically between about 1% and about 40% by weight. If component (i) is a high molecular weight compound (as defined), then the proportion of component (iii) is typically between about 1 and about 10% by weight. The proportion of the monocarboxylic acid (or acids) which is component (iv) is typically between about 4% and about 50% by weight. If component (i) is a high molecular weight compound (as defined) then the proportion of component (ii) is typically between about 4% and about 30% by weight.

The compounds used as components (i), (ii), (iii) and (iv) may contain functional groups in addition to those specified but such additional functional groups should not react with the hydroxyl groups or the carboxylic acid groups, and preferably should not adversely affect the reactivity of the hydroxyl groups or the carboxylic acid groups. Additional functional groups which may be present include halogen atoms, nitro and nitrile groups. In general, it is preferred that components (i), (ii), (iii) and (iv) do not contain any additional functional groups and that the compound is a hydrocarbon compound, or oxyalkylene compound, which contains only the specified groups.

The poly(oxyalkylene)-containing alkyd resins employed in the practice of the present invention contain ester groups produced by an esterification reaction which can be effected under conventional esterification conditions. Thus, the poly(oxyalkylene)-containing alkyd resins can conveniently be obtained by the reaction of component (i), (ii), (iii) and (iv) under esterification conditions. Conveniently all of the components are mixed together and reacted in a single step but, if desired, reaction can be effected in more than one step by adding at least one of the reactants to the mixture at a later state, after at least some reaction has occurred. Typically, esterification is effected in the absence of any inert liquid solvent/diluent at an elevated temperature in the presence of an esterification catalyst.

The esterification is preferably effected an an elevated temperature which is at least about 150° C. and preferably is at least about 200° C. The esterification temperature preferably does not exceed about 300° C.

Any suitable esterification catalyst may be used, for example phosphorus acid, p-toluenesulphonic acid, sodium methoxide, sodium hydroxide, potassium hydroxide or calcium hydroxide.

The esterification is typically effected at the elevated temperature for a time of at least about 0.5 hours. In general, a reaction time of less than 10 hours is sufficient, especially not more than 6 hours. However, it will be appreciated that the reaction time is dependent on many factors including the rate of heating to the reaction temperature and the degree of agitation used, a fast rate of heating and vigorous agitation permitting a shorter time.

The reaction product is discharged from the reaction vessel at an elevated temperature, whilst still in the liquid form and subsequently may be processed using conventional techniques to obtain the composition in any desired form. Processes for preparing certain of such alkyd resins are described in detail in European Patent Publication 325,054. One of ordinary skill in the art could easily adopt these processes to produce additional poly(oxyalkylene)-containing alkyd resins.

In addition to the polymeric particles, protective colloid and poly(oxyalkylene)-containing alkyd resin, the stabilized polymer latex compositions of this invention may further comprise surfactants which aid in the polymerization process. In general, useful surfactants include anionic or nonionic materials such as salts of alkyl sulfates, sulfonates, sulfosuccinates, organic phosphite esters and the like.

In general, the stabilized polymer latex of this invention can contain up to about 65% or more of solids content. One of ordinary skill in the art could easily determine the optimum solids concentration for a given latex and for a specific end use.

In general, the poly(oxyalkylene)-containing alkyd resin will be present in the polymeric latex composition in an amount of from about 0.01% to about 10% by weight of the polymeric component (A), with an amount between about 0.1% and about 5.0% by weight typically being preferred. The protective colloid is typically present in the composition in the amount of about 0.1% to and 10.0% by weight of the polymeric component (A), preferably at between about 0.5% and about 5.0% by weight of component (A).

Typically, the weight ratio of alkyd resin to protective colloid will range between about 4:1 and about 1:12 preferably between about 2:1 and about 1:8, more preferably between about 4:3 and about 1:6. However, it will be understood the most preferred ratio for any particular latex will vary in accordance with the particular alkyd resin and protective colloid selected, the composition of the polymeric particles and the conditions to which the latex will be exposed among other factors. One of ordinary skill in the art could easily optimize the amounts of protective colloid and poly(oxyalkylene)-containing alkyd resin to be added for any particular latex using routine experimentation, such as that described in the Examples hereof.

The stabilized latices of this invention are typically produced by blending the protective colloid, poly(oxyalkylene)-containing alkyd resin and monomer precursor, in an order, into an aqueous mixture, followed by subjecting such mixture to polymerization conditions. Such polymerization conditions typically involve the addition of an effective amount of a polymerization initiator, such as a persulfate, a peroxide, a reduction/oxidation initiator or the like, and continuing the reaction for a desired period of time.

The particular polymerization conditions for any given monomer(s) will be well known to one of ordinary skill in the art. Several suitable techniques are described by Elgood et al, J. Polyml Sci., Part B, Vol. 2, pages 257 et seq. (1964).

The polymeric latices of this invention exhibit unexpectedly desirable stability and reduced coagulum formation, particularly when compared to latices stabilized by the addition of the protective colloid or the poly(oxyalkylene)-containing alkyd resin alone.

EXAMPLES

The following Examples are intended to further illustrate the present invention and are not intended to limit the present invention in any matter whatsoever.

COMPARATIVE EXPERIMENT A 594 grams of distilled water, and 13.5 grams of polyvinyl alcohol (Elvanol® 52-22, degree of hydrolysis 87-89%, DuPont Co.) were added to a 2 liter flask equipped with condenser and agitator. The solution was deaerated and heated to 80° C. After holding at 80° C. for 30 minutes to dissolve the polyvinyl alcohol, the solution was cooled to 60°, and 10.3 grams of ammonium sulfated alkylphenoxypolyethyleneoxyethanol (ATSURF® 1910 ICI Americas Inc.), along with 2.4 grams of 28% ammonium hydroxide were added. 48 grams of vinyl acetate were added to the flask, followed by a solution of 1.5 grams of sodium persulfate in 6.0 grams of distilled water. The mixture was heated to 73° C. over 10 minutes, after which a monomer solution of 546.0 grams of vinyl acetate and 6.0 grams of methacrylic acid was added to the reaction mixture at a steady rate over 4 hour period. After two hours of monomer solution addition, a solution of 1.5 grams of sodium persulfate in 6.0 grams of distilled water was added. When all the ingredients had been added, the mixture was reacted for 1 hour at 79° C., then cooled and filtered through 200 mesh screen. The resulting latex contained 49.6% solids and had a viscosity of 920 cps as determined by Brookfield viscometer. The amount of coagulum retained on the screen was 0.5 gram.

EXAMPLE 1

The procedure of Comparative Experiment A was repeated with the exception that 1.5 grams of polyoxyethylene containing alkyd resin (produced by the reaciton of 62.7% PEG 800 (polyethylene glycol with molecular weight 800), 3.4% pentaerythritol, 7.2% trimellitic anhydride, and 26.7% tall oil fatty acid, all by weight) were added to the monomer solution, while the amount of polyvinyl alcohol was reduced to 12.0 grams. The resulting latex contained 49.5% solids and had a viscosity of 740 cps as determined by Brookfield viscometer. Only trace amount of coagulum was observed on passage through a 200 mesh screen.

EXAMPLE 2

The procedure of Comparative Experiment A was repeated with the exception that 1.5 grams of polyoxyethylene containing alkyd resin (produced by the reaction of 48.0% PEG 600 (polyethylene glycol with molecular weight 600), 3.7% pentaerythritol, 8.5% trimellitic anhydride, and 39.8% tall oil fatty acid) were added to the monomer solution, while the amount of polyvinyl alcohol was 12.0 grams. The resulting latex contained 49.5% solids and had a viscosity of 440 cps as determined by Brookfield viscometer. Only a trace amount of coagulum was observed on filtering the latex through a 200 mesh screen.

Comparative Experiment B

To a 2 liter flask were added 594 grams of distilled water. The water was heated to 60° C. and 10.3 grams of ammonium sulfated alkylphenoxypolyethylene oxyethanol, 2.4 grams of 28% ammonium hydroxide, and 13.5 grams of polyoxyethylene-containing alkyd resin (produced by the reaction of 48.0% PEG 600, 3.7% penaerythritol, 8.5% trimellitic anhydride, 39.8% tall oil fatty acid) were added 48 grams of vinyl acetate were added to the flask, followed by the solution of 1.5 grams of sodium persulfate in 6.0 grams of distilled water. The mixture was heated to 73° C. over 10 minutes, after which a monomer solution of 546.0 grams of vinyl acetate and 6.0 grams of methacrylic acid was added to the reaction mixture at a steady rate over 4 hour period. After two hours of monomer solution addition, a soulution of 1.5 grams of sodium persulfate in 6.0 grams of distilled water was added. When all the ingredients had been added, the mixture was reacted for 1 hour at 79° C., then cooled and filtered through a 200 mesh screen.

The resulting latex contained 48.6% solids and had a viscosity of 40 cps as determined by Brookfield viscometer. The amount of coagulum on 200 mesh screen was 5.0 grams.

Comparative Experiment C

The procedure of Comparative Experiment B was followed except (a) that 10.5 grams of hydroxyethylcellulose (Natrosol, Aqualon Co.) were initially added to the distilled water and the mixture heated to 80° C. for 30 minutes and cooled to 60° C. prior to the addition of the other components and (b) that no polyoxyalkylene-containing alkyd resin was added.

The resulting latex contained 49.9% solids and had a viscosity of 2,170 cps as determined by Brookfield viscometer. Only trace amount of coagulum was observed on 200 mesh screen.

EXAMPLE 3

The procedure of Comparative Experiment C was repeated except that 9.0 grams of hydroxyethylcellulose were initially added and that 1.5 grams of polyoxyethylene containing alkyd resin (produced by the reaction of 48.0% PEG 600 (with molecular weight 600), 3.7% pentaerythritol, 8.5% trimellitic anhydride, 39.8% tall oil fatty acid) were added to the initial monomer solution.

The resulting latex contained 49.2% solids and had a viscosity of 760 cps as determined by Brookfield viscometer. Only a trace amount of coagulum was observed on filtering the latex through a 200 mesh screen.

EXAMPLE 4

The procedure of Example 3 was repeated except that 4.5 grams of hydroxyethylcellulose and 6.0 grams of polyoxyethylene-containing alkyd resin were added. The resulting latex contained 51.3% solids and had a viscosity of 1,660 cps as determined by Brookfield viscometer. Only a trace amount of coagulum was observed on passage through a 200 mesh screen.

Stability Testing

To test the stability of the polymeric latices of Examples 3 and 4 and of Comparative Experiments C. and D, 200 grams of each polymeric latex which had previously been passed through a 200 mesh screen were placed on Hamilton Beach blender at "high" setting for 15 minutes. After the test, the samples were filtered through 200 mesh screen to detect the amount of formed coagulum. The results are given in the table below.

TABLE 1

| Example or Comparative Experiment | Alkyl Resin* | Protective Colloid* | Coagulum on 200 mesh screen | |
|---|---|---|---|---|
| | | | Initial | Stability Test |
| B | 2.25 | — | 5.0 g | Trace |
| C | — | 1.75 | Trace | Coagulated Completely |
| 3 | 0.25 | 1.5 | Trace | Trace |

TABLE 1-continued

| Example or Comparative Experiment | Alkyl Resin* | Protective Colloid* | Coagulum on 200 mesh screen | |
| --- | --- | --- | --- | --- |
| | | | Initial | Stability Test |
| 4 | 1.0 | 0.75 | Trace | Trace |

*in parts per 100 parts of monomer.

The above data indicates that only those latices which contained both a protective colloid and a poly(oxyalkylene)-containing alkyd resin exhibited both initial stability as well as stability after being subjected to intense agitation.

What is claimed is:

1. A stabilized aqueous polymer latex composition comprising:
    (A) polymeric latex particles:
    (B) a protective colloid; and
    (C) a poly(oxyalkylene)-containing alkyd resin which is the reaction product of:
       (i) at least one poly(oxyalkylene) compound with hydroxyl and groups;
       (ii) at least one polyol;
       (iii) at least one polycarboxylic acid, chloride or anhydride: and
       (iv) at least one monocarboxylic acid.

2. A latex composition in accordance with claim 1 wherein said polymers are prepared from at least one monomer containing at least one ethylenically unsaturated bond.

3. A latex composition in accordance with claim 1 wherein said polymers are prepared from at least one monomer selected from the group consisting of alkyl acrylates, alkyl methacrylates, vinyl monomers, and hydroxy-containing unsaturated compounds.

4. A latex composition in accordance with claim 3 wherein said polymeric particles are selected from the group consisting of poly(vinylacetate), poly(styrene), poly(vinylchloride) and poly(methylmethacryate).

5. A latex composition in accordance with claim 1 wherein the polymeric particles of Component (A) have a diameter between about 0.01 and about 10 microns.

6. A latex composition in accordance with claim 5 wherein the polymeric particles of Component (A) have a diameter of between about 0.05 and about 7 microns.

7. A latex composition in accordance with claim 6 wherein the polymeric particles of Component (A) have a particle size of between about 0.1 and about 5 microns.

8. A latex composition in accordance with claim 1 wherein the protective colloid, Component (B), is selected from the group consisting of polyvinyl alcohol, cellulosics, polyacrylamides, guar gum and xantham gum.

9. A latex composition in accordance with claim 8 wherein protective colloid is selected from the group consisting of polyvinyl alcohol, hydroxyethyl cellulose, hydroxypropyl cellulose, carboxymethyl cellulose and carboxyethyl cellulose.

10. A latex composition in accordance with claim 1 wherein the poly(oxyalkylene) compound reacted to produce Component (C) is of the formula $(AO)_n$ wherein A is an alkylene group containing 2 to 6 carbon atoms and n is an integer with a value of at least 2.

11. A latex composition in accordance with claim 10 wherein said poly(oxyalkylene) compound is a poly(oxyethylene) compound.

12. A latex composition in accordance with claim 1 wherein the polyol Component (C)(ii) is selected from the group consisting of glycerol, pentaerythritol, sorbitol and a mixture of pentaerythritol and sorbitol.

13. A latex composition in accordance with claim 1 wherein the polycarboxylic Component (C)(iii) is selected from the group consisting of malonic acid, succinic acid, glutaric acid, adipic acid, subaric acid, maleic acid, phthalic acid, terephthalic acid, isophthalic acid, trimelitic acid, pyromelitic acid, succinic anhydride, maleic anhydride, phthalic anhydride, pyromelitic dianhydride, trimelitic anhydride, terephthalic acid dichloride and adipic acid dichloride.

14. A latex composition in accordance with claim 1 wherein monocarboxylic acid Component (C)(iv) is selected from the group consisting of hexanoic acid, octanoic acid, decanoic acid, tetradecanoic acid, octadecanoic acid, oleic acid, tall oil fatty acid and linoleic acid.

15. A latex composition in accordance with claim 1 wherein said composition further comprises an anionic or nonionic surfactant.

16. A latex composition in accordance with claim 1 wherein said latex contains up to about 65% by weight solids.

17. A latex composition in accordance with claim 1 wherein the poly(oxyalkylene)-containing alkyd resin is present at between 0.01 and about 10% by weight, based on the weight of polymeric Component (A).

18. A composition in accordance with claims 17 wherein the poly(oxyalkylene)-containing alkyd resin is present at between 0.1 and about 5.0 weight percent, based on the weight of polymeric Component (A).

19. A latex composition in accordance with claim 1 wherein the protective colloid is present at between about 0.1 and about 10% by weight, based upon the weight of polymeric Component (A).

20. A latex composition in accordance with claim 19 wherein the protective colloid is present at between about 0.5 and about 5% by weight, based on the weight of polymeric Component (A).

21. A latex composition in accordance with claim 1 wherein the weight ratio of alkyd resin to protective colloid is between about 4:1 and about 1:12.

22. A latex composition in accordance with claim 21 wherein the weight ratio of alkyd resin to protective colloid is between about 2:1 and about 1:8.

23. A latex composition in accordance with claim 22 wherein the weight ratio of alkyd resin to protective colloid is between about 4:3 and about 1:6.

* * * * *